Nov. 21, 1933.                G. G. SWARD                 1,935,752
                       SURFACE TESTING APPARATUS
                         Filed April 19, 1932

Inventor
George G. Sward,
By K. P. McElroy
          Attorney

Patented Nov. 21, 1933

1,935,752

UNITED STATES PATENT OFFICE 1,935,752

SURFACE TESTING APPARATUS

George G. Sward, Takoma Park, Md.

Application April 19, 1932. Serial No. 606,216

9 Claims. (Cl. 265—12)

This invention relates to surface testing apparatus; and it comprises certain apparatus useful for testing the surface hardness of painted, varnished, lacquered and other surfaces, this apparatus comprising a pair of spaced rocker arms carrying a weight, means for shifting the center of gravity of the weight, a pendulum operated by the rocker arms from a point directly above the weight and a scale or measuring device cooperating with the pendulum for measuring the angle of deflection of the device and aiding in determining the number or time of oscillations of the device; all as more fully hereinafer set forth and as claimed.

"Hardness" is a term with various meanings, but in the case of painted and varnished surfaces one form may be taken as the resilient resistance to deformation. This is the useful hardness in a varnished surface. Many methods are known of taking the hardness of such surfaces but, for the most part, they depend upon application of forces greater than the elastic limit; and this is hardly a fair test. "Brinell hardness" is ascertained by measuring the force required to make a steel ball crush the surface; and there is an instrument in use measuring the same type of hardness wherein a similar ball rocks or rolls on a surface and crushes through to make a groove.

In the present invention, I provide means for testing surface hardness which depend upon the fact that the coefficient of rolling friction, with a non-tacky surface, corresponds more or less closely to the useful hardness of the surface. The lower the coefficient of rolling friction, the harder is the surface. The operation of the apparatus is independent of the thickness of the varnish or paint film and is, for that reason, widely applicable.

In the present invention there is provided a rocking device light in weight, and having rocking arms of relatively large radius, whereby the device is capable of rolling easily upon a surface without marring it. An indicating scale is attached to the lower part of the device, and a pendulum is hung from a fulcrum in the upper part of the device. The pendulum rod, which moves substantially parallel to itself while the device is oscillating, serves as an indicator, co-acting with the scale, to indicate the angular deflection of the device as it rocks. The device, when set to rocking on a surface, has its oscillations damped. The amount of damping depends on the nature of the particular surface; the instrument indicating this nature. Hardness may be quickly and accurately determined and there is no indentation or marring of a finished surface of the material being tested.

In the accompanying illustration I have shown, diagrammatically, an apparatus within the purview of the present invention.

In this showing,

Figure 1:
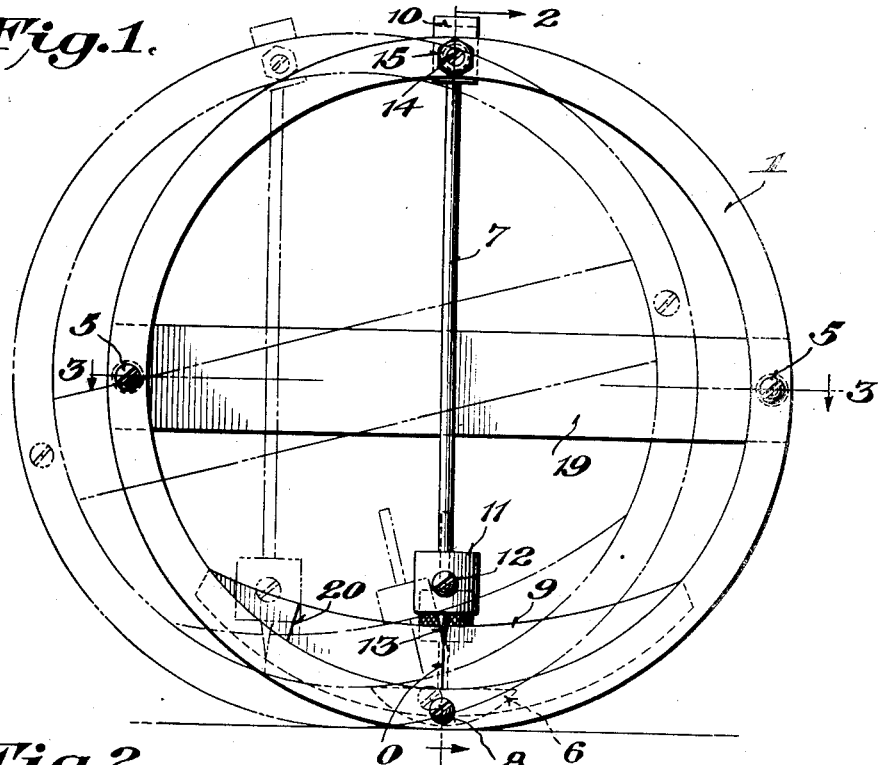
Fig. 1 is a front elevation showing the instrument at rest and also showing in dotted lines the instrument rolled toward the starting position at the beginning of a test.
Figure 2:
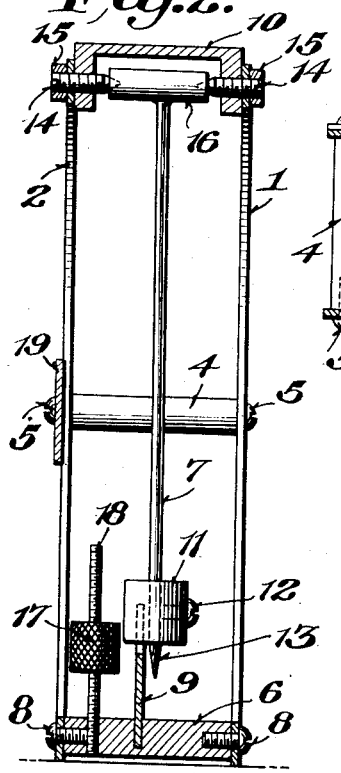
Fig. 2 is a sectional view taken along line 2—2 of Fig. 1.
Figure 3:
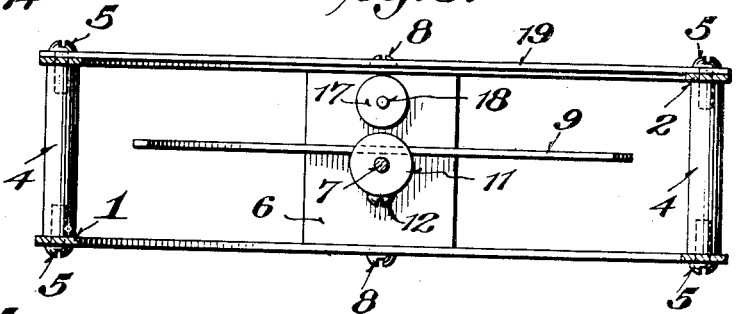
Fig. 3 is a sectional view taken along line 3—3 of Fig. 1.

Referring to the drawing the numerals 1 and 2 indicate a pair of rocker arms or circular rings spaced from each other by bushings 4 to which they are secured by bolts 5. The assembled rings constitute the frame of the instrument which carries a weight 6 and a pendulum 7. The weight 6 is secured to the lower portion of the frame by bolts 8 and is provided with an upwardly turned crescent shaped scale 9 about midway between its ends. The pendulum hangs from a bearing 10 positioned diametrically opposite the center of gravity of the weight 6 and carries a small weight 11 adjustable along the pendulum and held in any position by set screw 12. By means of the small adjustable weight the effective length of the pendulum may be readily changed to provide for different times of oscillation of the instrument. The pendulum serves as a pointer, and also serves to make the period of oscillation (the time taken in making one complete swing from left to right and return) of the instrument slower than it would be in an instrument having the same total weight, but having no pendulum. Although the complete oscillating device is light in weight and small in size, it has a rather long period of oscillation. Counting of the oscillations is facilitated. The extreme lower end of the pendulum terminates in a pointer 13 which travels across the face of the scale 9 to indicate the angle of deflection of the instrument. The bearing 10 consists of a yoke shaped member fitting between the rings 1 and 2, and carrying pivot screws 14 which are locked in position by lock nuts 15. The end of the pivot screws are pointed and set or rest lightly in and engage the end of the horizontal extension 16 on the upper end of the pendulum. Provision is made for changing the center of gravity of the instrument by adjusting the height of a small weight 17 which is in screw threaded engagement with a relatively short vertical rod 18 secured at its lower end to the weight 6 in a position immediately to the rear of the scale 9. This small weight 17 has a knurled outer surface so that it may be easily grasped by the fingers and turned to screw it up or down the rod. The higher the weight is adjusted the higher the center of gravity.

Cross plate 19 connecting diametrically opposite sides of the ring 2 at its points of contact with the bushing 4 is a name plate. The scale 9 may be provided with any number or degree of graduations but for the purpose of this description there are shown only two, namely, 0 (zero) and a mark which may be used as an end point in using the instrument and which I have designed by the numeral 20.

In operation, the surface to be tested which may be a varnished or lacquered surface, is first placed upon a level support. This condition will be indicated by the position of the pendulum registering with the zero mark on the scale when the instrument is placed upon the surface. The instrument is then rolled until the pendulum rests lightly against bushing 4, and is then released to roll backward and forward until the pointer just coincides with the graduation 20 on the scale. The oscillations which take place during this interval are counted, and the number is taken as an arbitrary comparison value for the "hardness" of the surface tested. For instance the instrument may be adjusted by varying the position of the weight 17, to rock or oscillate 50 times on a certain glass and this may be used as a standard or control for determining the hardness of various other surfaces such as the surfaces of coating compositions. Another method is to time the period during which the device oscillates. Ordinary differences in the character of surfaces will not, for all practical purposes affect the accuracy of the instrument, but when the surface is tacky a little talcum should be sprinkled on it before the instrument is used, to prevent any actual sticking of the surface to the rocking members. In case brush marks, bubbles or particles of dirt are too numerous, the surface may be lightly sand-papered without affecting the results. The instrument may be used for determining the dryness of a particular coat of varnish or lacquer etc., for instance if the instrument oscillates 30 times on a surface which is known to be dry, the softness of a partly dried surface may cause it to only oscillate 15, 20 or 25 times.

The instrument herein provided is simple in construction and operation and extremely accurate. When testing for hardness it neither mars the surface nor injures it in any way. This is because of its lightness, and the large radius of the rockers. The instrument is particularly adapted for testing the hardness of thin films of coating material but its use is not to be limited for testing film hardness only, since the invention is useful for testing the hardness of glazed paper, etc.

Whatever the theory of operation, the present invention gives accurate comparative figures of hardness for films of different coating materials such as varnishes, etc.

What I claim is:—

1. Apparatus for testing hardness of surfaces comprising a member adapted to be rocked forward and backward on the substance to be tested and a pendular member pivotally secured to said first member.

2. Apparatus for testing hardness of surfaces comprising a weighted member adapted to rock forward and backward on the substance to be tested and a pendulum pivotally secured to said first member for indicating the angular movement of said weighted member.

3. Apparatus for testing hardness of surfaces comprising a weighted member adapted to rock forward and backward on the surface of the substance to be tested and a pendulum carried by said weighted member, said pendulum serving to lengthen the natural free period of oscillation of the weighted member.

4. Apparatus for testing hardness of materials comprising a weighted member adapted to rock forward and backward on the surface of the material to be tested, a weighted pendulum adapted to move to and fro during the rocking of the weighted member to increase the natural period of oscillation thereof and a scale cooperating with said pendulum for indicating the angular displacement of said weighted member.

5. Apparatus for testing the hardness of materials comprising a rocking member, a weight rigidly secured to said member, pendular indicating means pivotally attached to said rocking member for indicating the angular displacement thereof and means for raising or lowering the center of gravity of said weight.

6. Apparatus for testing the hardness of materials comprising a pair of spaced rocker arms adapted to rock upon the surface to be tested, a weight rigidly secured to the rocker arms, a pendulum supported by said rocker arms and a weight on the pendulum, said last-mentioned weight being adjustable along the length of the pendulum to vary the effective length of the pendulum.

7. Apparatus for testing the hardness of materials comprising a curved rocking member, indicating means pivotally secured to said rocking member for indicating the angular deflection thereof, a weight, and means for attaching the weight to the apparatus and for adjusting its position with respect to the apparatus, whereby the center of gravity of the apparatus may be varied.

8. A hardness testing device adapted for use on level surfaces comprising a curved rocking member adapted to rock on a surface to be tested, and weighting means secured to said member and located entirely above the lower surfaces of the rocking member in all operative positions of the rocking member, whereby the rocking member may be used on surfaces of any extent.

9. A hardness testing device adapted for testing the hardness of level surfaces of any extent, comprising a weighted rocking member provided with bearing surfaces adapted to engage a surface to be tested, the bearing surfaces of the rocker being the lowest portion of the rocker in all operating positions of the rocker, and means, located entirely above the said bearing surfaces, for indicating angular deflection of the rocking member.

GEORGE G. SWARD.